US010365661B2

(12) United States Patent
Jägenstedt et al.

(10) Patent No.: US 10,365,661 B2
(45) Date of Patent: Jul. 30, 2019

(54) NAVIGATION FOR A ROBOTIC WORKING TOOL

(71) Applicant: HUSQVARNA AB, Huskvarna (SE)

(72) Inventors: Patrik Jägenstedt, Tenhult (SE); Mattias Kamfors, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 124 days.

(21) Appl. No.: 15/322,757

(22) PCT Filed: Jun. 30, 2014

(86) PCT No.: PCT/EP2014/063803
§ 371 (c)(1),
(2) Date: Dec. 29, 2016

(87) PCT Pub. No.: WO2016/000734
PCT Pub. Date: Jan. 7, 2016

(65) Prior Publication Data
US 2017/0139419 A1    May 18, 2017

(51) Int. Cl.
*G05D 1/02* (2006.01)
*A01D 34/00* (2006.01)
(Continued)

(52) U.S. Cl.
CPC ......... *G05D 1/0276* (2013.01); *A01D 34/008* (2013.01); *B60L 1/003* (2013.01);
(Continued)

(58) Field of Classification Search
CPC ............................ G05D 1/0276; A01D 34/008
See application file for complete search history.

(56) References Cited

U.S. PATENT DOCUMENTS

2007/0271011 A1* 11/2007 Lee ...................... G05D 1/0242
700/245
2012/0029753 A1* 2/2012 Johnson ............... A01D 34/008
701/23
(Continued)

FOREIGN PATENT DOCUMENTS

EP    2413215 A2    2/2012
EP    2626760 A2    8/2013
(Continued)

OTHER PUBLICATIONS

International Search Report and Written Opinion for International Application No. PCT/EP2014/063803 dated Mar. 5, 2015.
(Continued)

*Primary Examiner* — Jess Whittington
(74) *Attorney, Agent, or Firm* — Burr Forman McNair (57) ABSTRACT

A robotic work tool system (200) comprising a charging station (210) and a robotic work tool (100), said robotic work tool (100) comprising a position determining device (190) and a controller (210), wherein said controller (210) is configured to determine a current position for the robotic work tool (100) based on the position determining device (190), determine a first distance from the current position to said charging station (210), cause said robotic work tool (100) to travel a predetermined distance or for a predetermined time, determine a new current position for the robotic work tool (100) based on the position determining device (190), determine a second distance from the new current position to said charging station (210), determine if the second distance is larger than the first distance; and if so, cause the robotic work tool (100) to turn towards the charging station (210).

8 Claims, 4 Drawing Sheets

(51) Int. Cl.
 *B60L 1/00* (2006.01)
 *B60L 3/00* (2019.01)
 *B60L 8/00* (2006.01)
 *B60L 15/20* (2006.01)
 *B60L 53/16* (2019.01)
 *B60L 50/52* (2019.01)
 *B60L 53/36* (2019.01)
 *B60L 50/60* (2019.01)

(52) U.S. Cl.
 CPC .......... *B60L 3/0061* (2013.01); *B60L 8/003* (2013.01); *B60L 15/20* (2013.01); *B60L 50/52* (2019.02); *B60L 50/66* (2019.02); *B60L 53/16* (2019.02); *B60L 53/36* (2019.02); *G05D 1/028* (2013.01); *G05D 1/0225* (2013.01); *G05D 1/0265* (2013.01); *G05D 1/0278* (2013.01); *B60L 2200/40* (2013.01); *B60L 2240/36* (2013.01); *B60L 2240/421* (2013.01); *B60L 2240/622* (2013.01); *B60L 2260/32* (2013.01); *G05D 2201/0208* (2013.01); *Y02T 10/645* (2013.01); *Y02T 10/7005* (2013.01); *Y02T 10/705* (2013.01); *Y02T 10/7072* (2013.01); *Y02T 10/7083* (2013.01); *Y02T 10/72* (2013.01); *Y02T 10/7275* (2013.01); *Y02T 90/14* (2013.01)

(56) References Cited

U.S. PATENT DOCUMENTS

2013/0211646 A1\* 8/2013 Yamamura ........... G05D 1/0225
 701/22
2015/0366137 A1\* 12/2015 Markusson ............. G05D 1/03
 320/107

FOREIGN PATENT DOCUMENTS

WO 2011129728 A1 10/2011
WO 2012044220 A1 4/2012

OTHER PUBLICATIONS

International Preliminary Report on Patentability for International Application No. PCT/EP2014/063803 dated Jan. 3, 2017.

\* cited by examiner

NAVIGATION FOR A ROBOTIC WORKING TOOL

TECHNICAL FIELD

This application relates to a robotic work tool system for improved navigation, and in particular to a robotic work tool system for improved navigation to a charging station.

BACKGROUND

Many robotic work tool systems are enabled to allow the robotic work tool to find a charging station by either following the boundary following a so called F-field. However, if the F-field can not be sensed or if the route in the F-field is blocked, the robotic work tool may waste time and power trying to find the charging station.

Using positioning devices such as GPS (Global Positioning System) to navigate for example a robotic lawnmower may lead to that the robotic work tool navigates incorrectly at times or places where satellite reception is compromised, for example by threes or structures, commonly found in for example gardens.

There is thus a need for a robotic work tool system with a robotic work tool that is able to find its way to charging station without wasting time or power, while relying on traditional navigational methods.

SUMMARY

It is an object of the teachings of this application to overcome the problems listed above by providing robotic work tool system comprising a charging station and a robotic work tool, said robotic work tool comprising a position determining device and a controller, wherein said controller is configured to determine a current position for the robotic work tool based on the position determining device, determine a first distance from the current position to said charging station, cause said robotic work tool to travel a predetermined distance or for a predetermined time, determine a new current position for the robotic work tool based on the position determining device, determine a second distance from the new current position to said charging station, determine if the second distance is larger than the first distance; and if so, cause the robotic work tool to turn towards the charging station.

In one embodiment the robotic work tool is a robotic lawnmower. In one embodiment the robotic work tool 100 is a farming equipment. In one embodiment the robotic work tool 100 is a golf ball collecting tool. The robotic work tool 100 may also be a vacuum cleaner, a floor cleaner, a street sweeper, a snow removal tool, a mine clearance robot or any other robotic work tool that is required to operate in a work area in a methodical and systematic or position oriented manner.

It is also an object of the teachings of this application to overcome the problems listed above by providing method for use in a robotic work tool system comprising charging station and a robotic work tool, said robotic work tool comprising a position determining device, wherein said method comprises: determining a current position for the robotic work tool based on the position determining device; determining a first distance from the current position to said charging station; causing said robotic work tool to travel a predetermined distance or for a predetermined time; determining a new current position for the robotic work tool based on the position determining device; determining a second distance from the new current position to said charging station; determining if the second distance is larger than the first distance; and if so, causing the robotic work tool to turn towards the charging station.

The inventors of the present invention have realized, after inventive and insightful reasoning, that a robotic work tool configured to follow a boundary wire for as long as possible before leaving to travel to the charging station and by determining when the distance to the charging station is the shortest a virtual F-field is provided which allows the robotic work tool to use tried and reliable navigational methods while not wasting time or power looking for the charging station.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
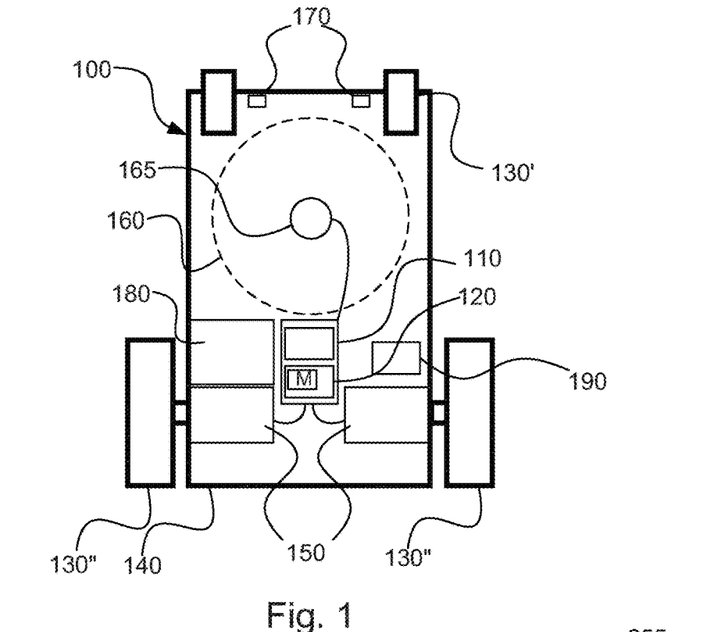
FIG. 1 shows a schematic overview of a robotic work tool according to one embodiment of the teachings of this application.

FIG. 1 shows a schematic overview of a robotic work tool 100 having a body 140 and a plurality of wheels 130. In the exemplary embodiment of FIG. 1 the robotic work tool 100 has 4 wheels 130, two front wheels 130' and the rear wheels 130". At least some of the wheels 130 are drivably connected to at least one electric motor 150. It should be noted that even if the description herein is focussed on electric motors, combustion engines may alternatively be used possibly in combination with an electric motor.

In the example of FIG. 1, the rear wheels 130" are connected to each an electric motor 150. This allows for driving the rear wheels 130" independently of one another which, for example, enables steep turning.

The robotic work tool 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic work tool 100. The controller 110 may be implemented using any suitable, publically available processor or Programmable Logic Circuit (PLC). The memory 120 may be used for storing various instructions and data, such as a map application M and may be implemented using any commonly known technology for computer-readable memories such as ROM, RAM, SRAM, DRAM, FLASH, DDR, SDRAM or some other memory technology.

The robotic work tool 100 further has at least one sensor 170, in the example of FIG. 1 there are two sensors 170, arranged to detect a magnetic field (not shown). The sensors are connected to the controller 110 and the controller 110 is configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic work tool 100 is inside or outside an area (referenced 205 in FIG. 2) enclosed by a boundary wire (referenced 250 in FIG. 2).

The controller 110 is connected to the motors 150 for controlling the propulsion of the robotic work tool 100 which enables the robotic work tool 100 to service an enclosed area without leaving the area.

The robotic work tool 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The controller is also configured to determine the load exerted on the rotating blade, by for example measure the power delivered to the cutter motor 165 or by measuring the axle torque exerted by the rotating blade. The robotic work tool 100 is, in one embodiment, a robotic lawnmower.

The robotic work tool 100 may also have (at least) one battery 180 for providing power to the motors 150 and the cutter motor 165. Connected to the battery 180 are two charging connectors for receiving a charging current from a charger (referenced 220 in FIG. 2) of the charging station (referenced 210 in FIG. 2).

Alternatively, the batteries may be solar charged.

Alternatively, the robotic work tool and/or the cutter may be driven by an engine.

The robotic work tool 100 is also arranged with a position determining device 190, such as a GNSS (Global Navigation Satellite System) device 190. In one embodiment the GNSS device is a GPS (Global Positioning Service) device 190. The GNSS device 190 is connected to the controller 110 for enabling the controller 110 to determine a current position for the robotic work tool 100 using the GNSS device and to control the movements of the robotic work tool 100 based on the position. Other examples of position determining devices 190 include optical (such as laser) position determining devices, other radio frequency position determining systems, and ultrawideband (UWB) beacons and receivers.

Figure 2:
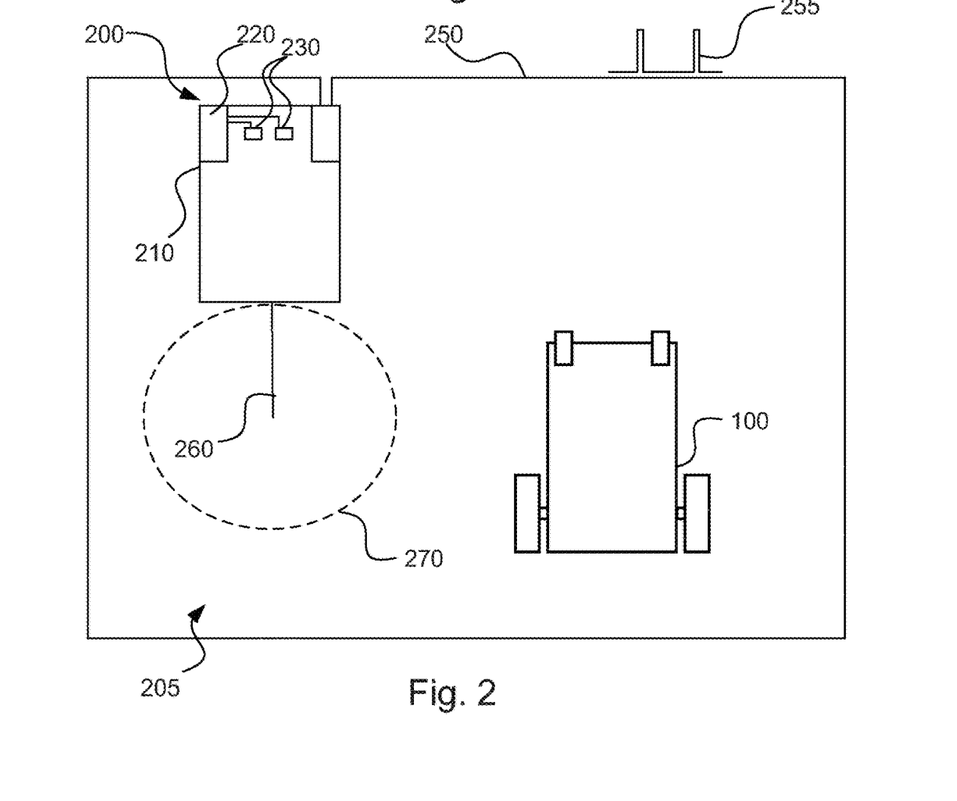
FIG. 2 shows a schematic view of a robotic working tool system according to one embodiment of the teachings of this application.

FIG. 2 shows a schematic view of a robotic working tool system 200 comprising a charging station 210 and a boundary wire 250 arranged to enclose a working area 205, the working area 205 not necessarily being a part of the robot system 200.

The robotic work tool 100 of FIG. 2 is a robotic work tool 100 such as disclosed with reference to FIG. 1. A charging station 210 has a charger 220 coupled to, in this embodiment, two charging connectors 230. The charging connectors 230 are arranged to co-operate with corresponding charging connectors 185 of the robotic work tool 100 for charging the battery 180 of the robotic work tool 100.

The charging station 210 also has, or may be coupled to, a signal generator 240 for providing a control signal 255 (for more details see FIG. 3) to be transmitted through the boundary wire 250. As is known in the art, the current pulses 255 will generate a magnetic field around the boundary wire 250 which the sensors 170 of the robotic work tool 100 will detect. As the robotic work tool 100 (or more accurately, the sensor 170) crosses the boundary wire 250 the direction of the magnetic field will change. The robotic work tool 100 will thus be able to determine that the boundary wire has been crossed.

Optionally, the charging station 210 also has a guide cable 260 for enabling the robot to find the entrance of the charging station 210. In one embodiment the guide cable 260 is formed by a loop of the boundary wire 250.

In one alternative or additional embodiment the guide wire 260 is used to generate a magnetic field for enabling the robotic work tool 100 to find the charging station without following a guide cable 260. Such a magnetic field is commonly referred to as an F-field 270 and the robotic work tool is configured to navigate to the charging station 210 by navigating towards an increasing field strength for the F-field 270. The F-field 270 may have its center at the charging station or at the guide wire 260. In the latter case the F-field 270 can be used to enable the robotic work tool 100 to find the guide cable 260 or the charging station 210 more quickly as it can jump the boundary wire as it senses the magnetic field from the F-field 270. In one embodiment the magnetic field from the F-field 270 is differentiated from the magnetic field of the boundary wire 250 through a difference in the control signal 255 being transmitted through the boundary wire 250 and the control signal generating the F-field 270.

The robotic work tool 100 may be configured to find the charging station 210 using the F-field 270 in different manners. One alternative is that the robotic work tool 100 randomly traverses the work area 205 until it finds the F-field 270. Another alternative is that the robotic work tool 100 follows the boundary wire 250 until it finds the F-field 270 and then shortcuts from the boundary wire 250 to the charging station 210 following the F-field 270.

Combinations of these alternatives are of course also possible, and also timed or distance-based combinations are possible. For example, a robotic work tool 100 may be configured to randomly search for the F-field 270 for 5 minutes, or spend time trying to find the F-field 270, and if no F-field 270 has been found, then the robotic work tool 100 follows the boundary wire 250 until the charging station 210 or the F-field 270 is found.

It should be noted that many other manners of generating the F-field also exist and are known in the field of robotic work tools.

Figure 3:
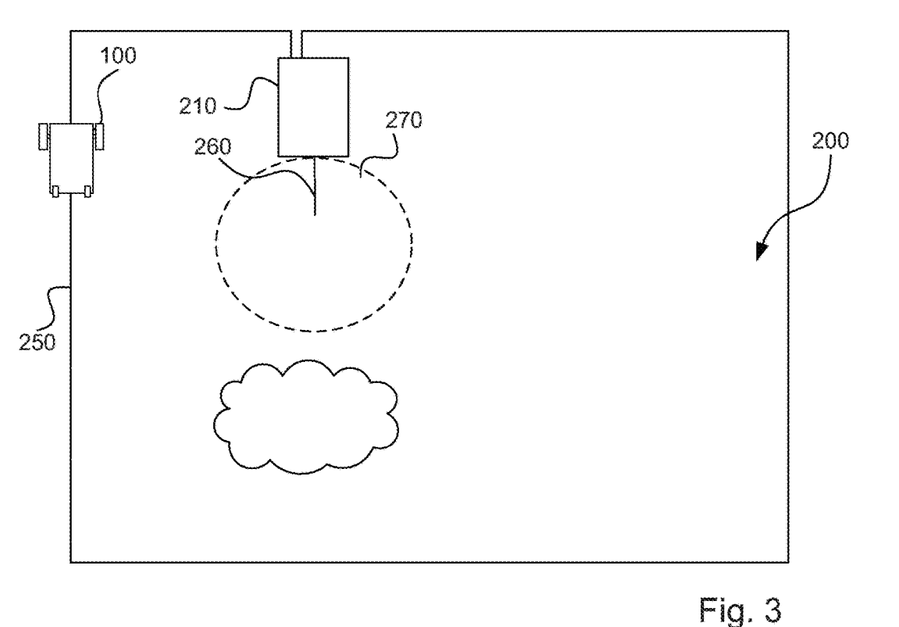
FIG. 3 shows a schematic overview of a robotic work tool system illustrating a problem with the contemporary use of F-fields for finding the charging station.

FIG. 3 shows a schematic overview of a robotic work tool system 200, such as the robotic work tool system 200 of FIG. 2, illustrating a problem with the contemporary use of F-fields 270 for finding the charging station 210. In the situation depicted in FIG. 3, the robotic work tool is too far away to sense the F-field 270 and is headed away from the charging station 210. The robotic work tool 100 will have to follow the boundary wire 250 all around to find the charging station 210. Alternatively, the robotic work tool 100 will jump the boundary wire 250 and start searching randomly for the ff270. In any case, the robotic work tool's current heading is taking the robotic work tool 100 away from the charging station 210 and runtime is lost trying to find a way back to the charging station 210 unnecessarily using the manners of the prior art to find the charging station 210.

Figure 4:
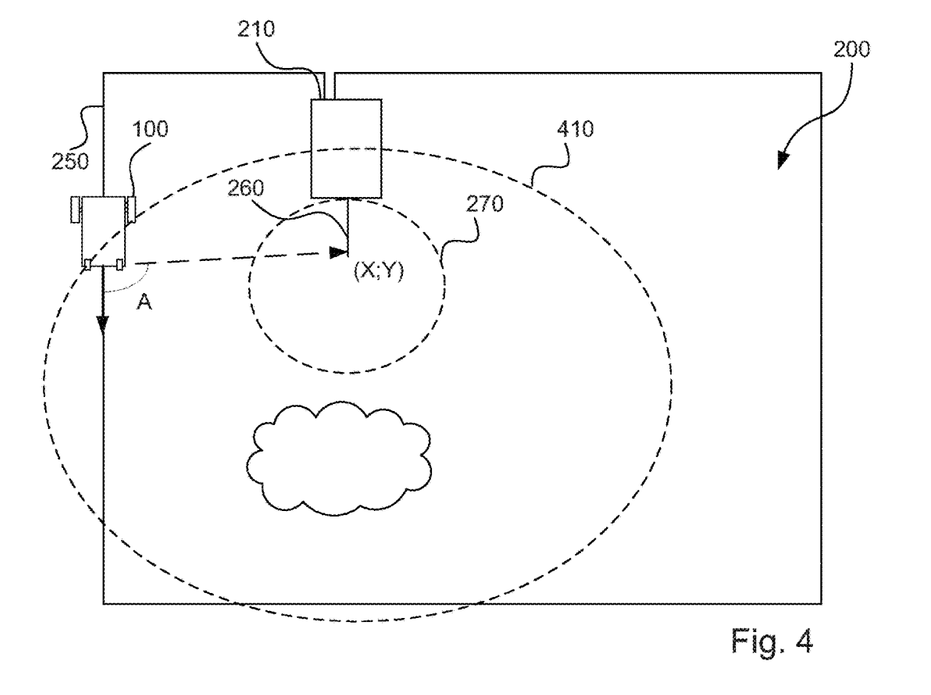
FIG. 4 shows a schematic overview of a robotic work tool system according to the teachings herein for overcoming the problems of the prior art.

However, by utilizing a position determining device, such as a GPS device 190, in combination with a map application (referenced M in FIG. 1) stored in the memory 120 of the robotic work tool 100 an improved manner of finding the way to the charging station 210 is provided. FIG. 4 shows a schematic overview of a robotic work tool system 200 according to the teachings herein for overcoming the problems of the prior art utilizing a GPS device 190 in combination with a map application M finding the way to the charging station 210.

The map application M may in its simplest form simply consist of coordinates for the charging station 210 or the guide cable 260. In the Example of FIG. 4 the map application M is simply the coordinates (X;Y) for the guide cable 260. Other more advanced maps such as being defined by Autoset 2.5 may also be used as will be discussed further below.

The robotic work tool 100 may be configured to utilize a virtual F-field 410 for finding the way to the charging station 210 (possibly via the guide cable 260). The virtual F-field 410 may be defined as an area within which there exists an alternative route to the charging station 210. The virtual F-field 410 may for example be defined using coordinates in the map application M.

To enable a faster localization of the charging station 210, the robotic work tool 100 is configured to determine a current position of the robotic work tool 100 and to determine whether the robotic work tool 100 is within the virtual F-field 410. If so, the robotic work tool 100 is configured to determine a (alternative) route to the charging station 210, wherein said route does not fully follow the boundary wire 250.

In the example of FIG. 4, the robotic work tool 100 is configured to determine that it is at a first distance to the charging station 210 or the guide cable 260 based on the map application M and the current position of the robotic work tool 100 (as the guide cable 260 leads to the charging station 210, there will not be made any difference between the distance to the charging station 210 and the distance to the guide cable 260 and the distance of the guide cable to the charging station 210 will be taken to be part of the distance between the robotic work tool 100 and the charging station 210). As the robotic work tool 100 moves forward a new current position and a second distance to the charging station 210 are determined by the robotic work tool 100 and the second distance is compared to the first distance. As long as the second distance is shorter than the first distance the robotic work tool moves forward and determines a new second distance, wherein the new first distance is set to the old second distance and the comparison is repeated. That the second distance is larger than the first distance indicates that the robotic work tool 100 is moving towards the charging station 210.

When it is determined by the robotic work tool 100 that the second distance becomes larger or is the same as the first distance—which indicates that the robotic work tool 100 is moving a way from the charging station 210—a current heading of the robotic work tool 100 and an angle A between the current heading of the robotic work tool 100 and the position of the charging station 210 are determined and the robotic work tool 100 is caused to turn that angle A and continue moving towards the robotic work tool 100. This should enable the robotic work tool 100 to find at least the F-field 270 or the guide cable 260 without any further advanced navigational procedures and also without unnecessarily spending time looking for the charging station 210.

By following the boundary cable 250 a reliable and tested navigation method is used as long as necessary, which navigation method is not dependent on clear satellite coverage or other environmental factors.

Figure 5:
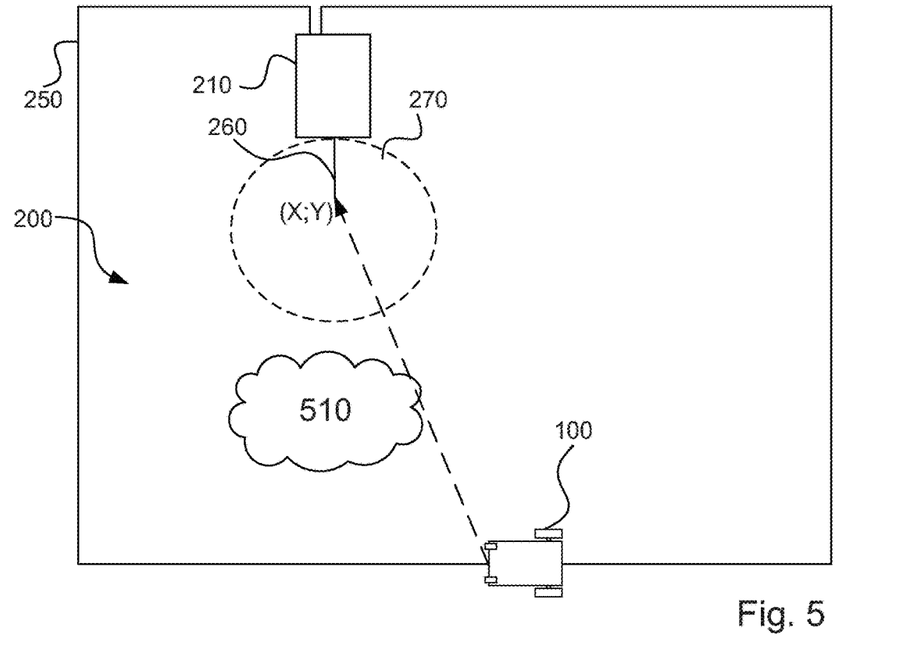
FIG. 5 shows an overview of an example robotic work tool system where an obstacle is blocking the closest route from the robotic work tool to the charging station.

Alternatively the robotic work tool releases from the boundary wire 250 before the route to the charging station 210 is blocked by the obstacle 510.

In some embodiments the map application M may be expanded to include coordinates or boundaries for obstacles, such as a bush, shrubbery, tree, pond or other obstacle, and/or shapes of the work area.

FIG. 5 shows an overview of an example robotic work tool system 200 where an obstacle 510 is blocking the closest route from the robotic work tool 100 to the charging station 210. As the robotic work tool 100 would determine that the second distance is larger than the first distance the robotic work tool 100 would be prevented from travelling straight to the charging station 210 as the route is blocked by an obstacle, such as a bush 510. Circum navigating the obstacle 510 may send the robotic work tool 100 in a direction that is away from the charging station 210. To prevent this and alleviate any problems caused by obstacles 510, the map application M further comprises coordinates or other information on obstacles 510 and as the robotic work tool determines that the second distance is larger than the first distance, the robotic work tool 100 is configured to determine if there is an obstacle 510 blocking the route to the charging station 210. If so, the robotic work tool 100 is configured to continue travel along the boundary wire 250 until the route from the robotic work tool 100 to the charging station 210 is no longer blocked by an obstacle 510. An obstacle may be determined to block a route between the robotic work tool 100 and the charging station 210 if coordinates for the obstacle 510, which coordinates may define an area of extension for the obstacle 510, is between the coordinates for the charging station 210 and the current position of the robotic work tool 100.

The robotic work tool 100 may also or alternatively be configured to proactively determine if an obstacle 510 will block a route between the robotic work tool 100 and the charging station 210 as the robotic work tool 100 continues travelling in its current heading and if so, determine whether to turn towards the charging station 210 even if the second distance is smaller than the first distance. Such determination may be made based on an extension of the obstacle 510. If it is determined that the obstacle 510 will block the route, the robotic work tool 100 is configured to determine a turn point where the route will not be blocked, but is also close to the point where the second distance equals the first distance.

Figure 6:
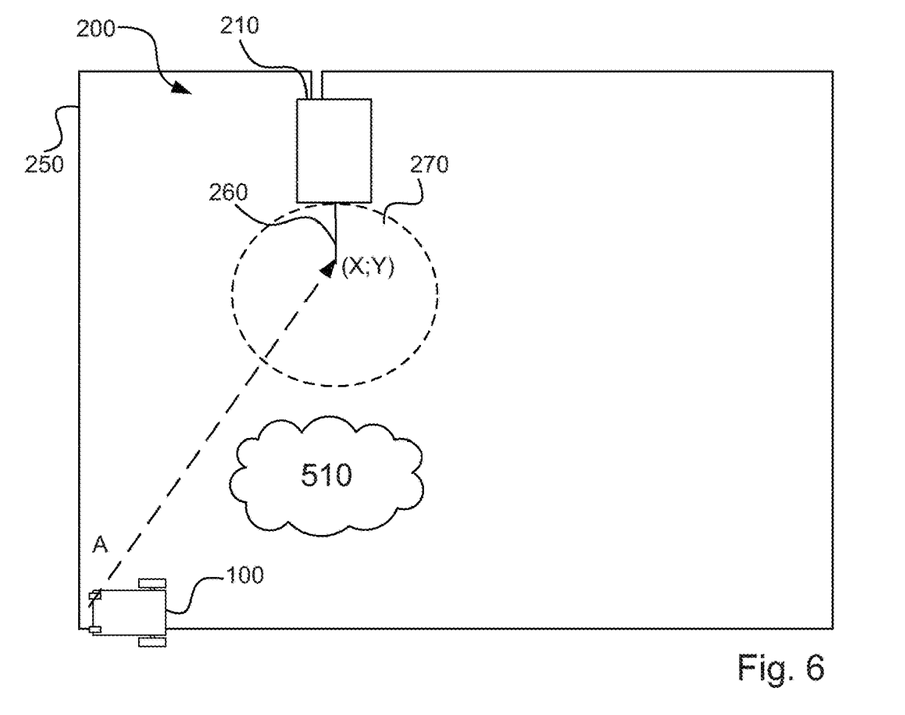
FIG. 6 shows an overview of an example robotic work tool system where the robotic work tool has moved away from the obstacle and the obstacle is no longer blocking the route from the robotic work tool to the charging station.

FIG. 6 shows an overview of an example robotic work tool system 200 where the robotic work tool 100 has moved away from the obstacle 510 and the obstacle is no longer blocking the route from the robotic work tool 100 to the charging station 210. An angle A may then be determined and the robotic work tool 100 will turn that angle A and travel towards the charging station 210.

Figure 7:
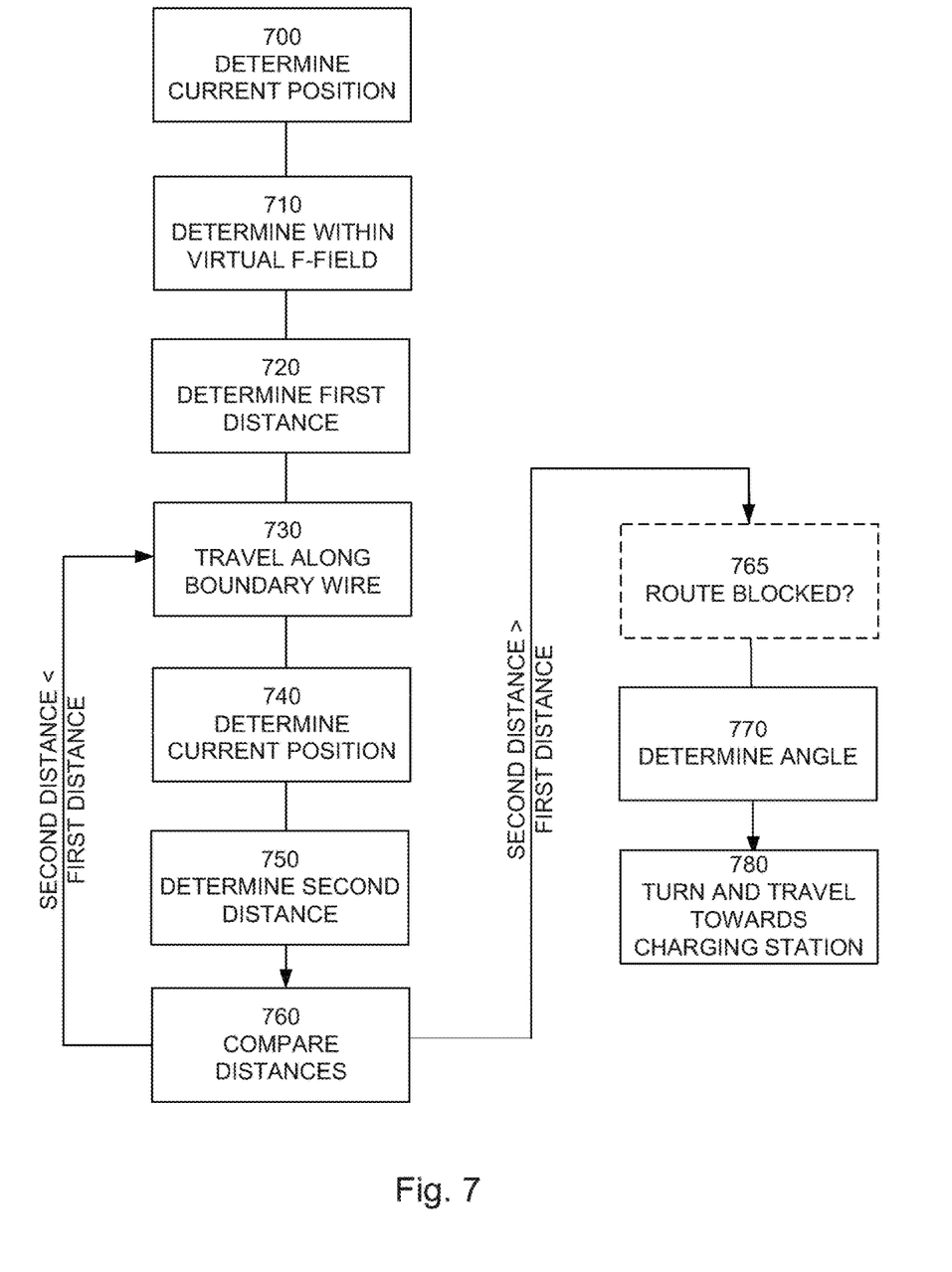
FIG. 7 shows a general flowchart for a method for operating a robotic work tool according to herein.

FIG. 7 shows a general flowchart for a method for operating a robotic work tool 100 according to herein. The method may be stored as instructions on a computer readable storage medium and as the instructions are loaded into and executed by a controller, the method is executed.

The robotic work tool 100 determines 700 its current position and determines 710 that the robotic work tool 100 is within a virtual F-field 410. The robotic work tool 100 then determines 720 a first distance to the charging station 210. Thereafter the robotic work tool 100 travels 730 along the boundary wire 250 for a predetermined time (such as 0.5, 1, 2, 5 or 10 seconds or continuously) or alternatively for a predetermined distance (such as 0.1, 0.2, 0.5, 1, 2 or 5 meters) and then determines 740 a new current position and determines 750 a second distance to the charging station 210. The robotic work tool 100 compares 760 the first distance to the second distance and if the second distance is smaller than the first distance, the robotic work tool 100 continues to travel along the boundary wire determining a new second distance, wherein a new first distance is the old second distance and compares again. If the second distance is larger than the first distance, the robotic work tool determines 770 an angle A from its current heading to the charging station 210 and turns that angle A, travelling towards the charging station 210.

What happens when the first distance equals the second distance may depend on a number of factors, such as the time travelled along eh boundary wire 250. In one embodiment the robotic work tool 100 is configured to determine the angle A and turn and travel towards the charging station 210. Alternatively, as is indicated b the dashed box in FIG. 7, and as ahs been disclosed in the above, the robotic work tool 100 may also be configured to determine if an obstacle 510 is blocking the route 765 from the robotic work tool 100 to the charging station 210, and if so, continue to travel a long the boundary wire 250 until the route is no longer blocked.

One benefit of the teachings herein is that tried navigational methods are used to the fullest without wasting time or energy trying to find the charging station 210. A navigation system solely or primarily relying on for example GPS devices 190, will in some situations suffer from bad satellite reception which may cause the robotic work tool 100 to navigate incorrectly.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool system comprising a charging station and a robotic work tool, said robotic work tool comprising a position determining device and a controller, wherein said controller is configured to:
   determine a current position for the robotic work tool based on the position determining device;
   determine a first distance from the current position to said charging station;
   cause said robotic work tool to travel along a boundary wire a predetermined distance or for a predetermined time;
   determine a new current position for the robotic work tool based on the position determining device;
   determine a second distance from the new current position to said charging station; and
   determine if the second distance is larger than the first distance,
   wherein if the second distance is not larger than the first distance, cause said robotic work tool to continue traveling along the boundary wire; and
   wherein if the second distance is larger than the first distance, cause the robotic work tool to turn a predetermined angle away from the boundary wire and follow a virtual F-field towards the charging station.

2. The robotic work tool system according to claim 1, wherein causing the robotic work tool to turn the predetermined angle comprises determining a current heading of the robotic work tool and determining an angle between the current heading and a position of the charging station and cause the robotic work tool to turn the angle.

3. The robotic work tool system according to claim 1, wherein the controller is further configured to determine if an obstacle is blocking a route along the boundary wire and if so cause said robotic work tool to turn the predetermined angle and to travel a predetermined distance or for a predetermined time away from the obstacle.

4. The robotic work tool system according to claim 1, wherein the controller is further configured to determine the distance to the charging station based on coordinates of the charging station and wherein the coordinates are stored as part of a map application in a memory of said robotic work tool.

5. The robotic work tool system according to claim 1, wherein the robotic work tool is a robotic lawnmower.

6. The robotic work tool system according to claim 1, wherein the position determining device is a global positioning device.

7. A method for use in a robotic work tool system robotic work tool system comprising a charging station and a robotic work tool, said robotic work tool comprising a position determining device, wherein said method comprises:
   determining a current position for the robotic work tool based on the position determining device;
   determining a first distance from the current position to said charging station;
   causing said robotic work tool to travel along a boundary wire a predetermined distance or for a predetermined time;

determining a new current position for the robotic work tool based on the position determining device;

determining a second distance from the new current position to said charging station;

determining if the second distance is larger than the first distance, wherein if the second distance is not larger than the first distance, causing said robotic work tool to continue traveling along the boundary wire; and wherein if the second distance is larger than the first distance, causing the robotic work tool to turn a predetermined angle away from the boundary wire and follow a virtual F-field towards the charging station.

8. The method of claim 7, wherein causing the robotic work tool to turn the predetermined angle comprises determining a current heading of the robotic work tool and determining an angle between the current heading and a position of the charging station and causing the robotic work tool to turn the angle and travel toward the charging station.

* * * * *

UNITED STATES PATENT AND TRADEMARK OFFICE
CERTIFICATE OF CORRECTION

PATENT NO. : 10,365,661 B2
APPLICATION NO. : 15/322757
DATED : July 30, 2019
INVENTOR(S) : Patrik Jägenstedt et al.

Page 1 of 1

It is certified that error appears in the above-identified patent and that said Letters Patent is hereby corrected as shown below:

In the Claims

In Column 8, Line 57, in Claim 7, "A method for use in a robotic work tool system robotic" should read --A method for use in a robotic--.

Signed and Sealed this
Eighth Day of October, 2019

Andrei Iancu
*Director of the United States Patent and Trademark Office*